United States Patent
Kajiwara et al.

(10) Patent No.: US 6,870,019 B2
(45) Date of Patent: Mar. 22, 2005

(54) LATEX FOR DIP MOLDING AND A DIP MOLDED PRODUCT

(75) Inventors: Yuuichiro Kajiwara, Osaka (JP); Shigeo Suzuki, Osaka (JP); Masaaki Tsuji, Osaka (JP); Takeshi Suetsugu, Osaka (JP)

(73) Assignee: Nippon A & L Inc., Osaka (JP)

( * ) Notice: Subject to any disclaimer, the term of this patent is extended or adjusted under 35 U.S.C. 154(b) by 71 days.

(21) Appl. No.: 09/994,758

(22) Filed: Nov. 28, 2001

(65) Prior Publication Data

US 2002/0111431 A1 Aug. 15, 2002

(30) Foreign Application Priority Data

Dec. 12, 2000 (JP) .................................. 2000-377099

(51) Int. Cl.$^7$ ......................... C08L 9/04; C08L 21/02; C08F 2/26; C08F 236/04; C08K 5/42

(52) U.S. Cl. ................. 526/225; 524/156; 526/227

(58) Field of Search .................... 526/225, 227; 524/156

(56) References Cited

U.S. PATENT DOCUMENTS 5,369,166 A    11/1994  Ozawa et al. ............... 524/560
5,750,618 A    5/1998   Vogt et al. ................. 524/836
6,492,446 B1 * 12/2002  Kajiwara et al. ........... 524/157

FOREIGN PATENT DOCUMENTS

| EP | 1 063 258 | | 12/2000 | |
| GB | 1 480 112 | | 7/1977 | |
| GB | 1480112 A | * | 7/1977 | ............ B29H/3/04 |
| JP | 5-86110 | | 4/1993 | |
| JP | 5-247266 | | 9/1993 | |
| JP | 7-316211 | | 12/1995 | |

* cited by examiner

*Primary Examiner*—Kelechi C. Egwim
(74) *Attorney, Agent, or Firm*—Wenderoth, Lind & Ponack, L.L.P.

(57) ABSTRACT

A latex for dip molding which comprises a latex obtained by emulsion polymerization of a monomer mixture in the presence of alkyl benzene sulfonate containing, based on 100 parts by weight of the monomer mixture, at least 10.0 parts by weight of a $C_{13-20}$ alkyl benzene sulfonate can be used for production of a high-quality dip molded product that is excellent in oil resistance and mechanical strength, has uniform film thickness, soft feeling to the skin and no pinholes and no shrinkage, and assumes anti-stickiness on the surface thereof after dip molding, as required in medical gloves and fingerstalls etc.

6 Claims, No Drawings

LATEX FOR DIP MOLDING AND A DIP MOLDED PRODUCT

TECHNICAL FIELD OF THE INVENTION

The present invention relates to a latex for dip molding, particularly a latex for dip molding which can be used for easily and efficiently producing a dip molded product having soft feeling to the skin as well as high oil-resistance, high mechanical strength, uniform film thickness, no pinholes, no shrinkage and anti-sticking property which are required for gloves and fingerstalls used in medical fields and in a clean room for producing electronic parts, and a dip molded product obtained therefrom.

BACKGROUND OF THE INVENTION

Dip molded products such as gloves and fingerstalls used in the fields of medicine, hygiene and in production site of electronic parts should be superior in oil resistance, mechanical strength, free of pinholes and excellent in close fitting and soft feeling thereof to the skin.

As the method of dip molding, there are known an anode coagulant dip process wherein a mold made of wood, glass, ceramics, metal or plastics is dipped in a coagulant solution and then dipped in a latex compound for a dip molding which comprises natural rubber latex or synthetic rubber latex, vulcanizing agent, vulcanization accelerator, vulcanization auxiliary, pH adjusting agent and the like, and a Teague dip molding process wherein a mold is dipped in the latex compound for dip molding and then dipped in a coagulant solution.

The thickness of a dip molded product, the occurrence of pinholes therein and the good close fitting and soft feeling to the skin depend mainly on the components of latex and a coagulant solution.

Most of latex used heretofore in the dip molding method is natural rubber latex or synthetic rubber latex, but for the reason of high resistance to oil and organic solvent, acrylonitrile butadiene rubber (NBR) latex is preferably used. Recently, owing to the development of allergy in those who use natural rubber latex, the NBR latex has been used more and more. However, molded products produced from NBR by dip molding, though being excellent in oil resistance, have high glass transition temperature (Tg), and thus they hardly give soft feeling to the skin.

Accordingly, there are methods wherein, for instance, a conjugated diene compound such as butadiene is used in a larger amount in production of NBR, or NBR is blended with natural rubber, or laminated on the natural rubber layer. In these cases, however, the resulting products are poor in oil or chemical resistance Meanwhile, as the method of obtaining NBR film which is excellent in oil resistance and has soft feeling to the skin, the methods wherein e.g. the molecular weight of latex and the content of insolubles in methyl ethyl ketone therein are proposed (JP-A 5-247266 and JP-A 6-182788), but the purpose has not been fully achieved.

For the same purpose, a method of using high-molecular latex having low gel content (JP-A 5-86110) has also been proposed, but the resulting molded product is yellowed and not suitable for medical purposes where white molded products are required.

In addition to the soft feeling to the skin, the absence of pinholes is important for the molded product. In particular, when the molded product is used for medical purposes, the presence of pinholes is fatal. The pinhole is easily generated if bubbles are mixed in latex, the chemical stability (salt coagulability) of the latex to a coagulant solution is inappropriate, or the wetting properties of the latex on a mold are not satisfactory. If such salt coagulability is inappropriate or the wetting properties of the latex on the mold are not satisfactory, then the thickness of the molded product may become uneven and pinholes may be generated.

It is also important for the molded products that the surface of the product is not sticky. This stickiness is a property permitting molded products to adhere one another owing to the sticking property on the surfaces of the molded products. Once the molded products assume stickiness on their surface, their qualities are lowered, resulting in a significant reduction in their commercial value.

Further, if the chemical stability (salt coagulability) of the latex to the coagulant is inappropriate, dip molded products produced by a Teague coagulant dip process wherein a mold is dipped in a latex and then dipped in a coagulant solution, undergo shrinkage of the molded product resulting in a significant reduction in their commercial value.

SUMMARY OF THE INVENTION

The object of the present invention is to provide a latex for dip molding, which can be used for production of a dip molded product that is excellent in oil resistance and mechanical strength, has uniform film thickness, soft feeling to the skin of the user and no pinholes or shrinkage and assumes anti-stickiness on the surface thereof after dip molding.

As a result of their eager study for solving these objects, the present inventors found that a latex obtained by emulsion polymerization of a monomer mixture, wherein alkyl benzene sulfonate containing at least 10 weight %, preferably 25 weight %, more preferably 40 weight % of a $C_{13-20}$ alkyl benzene sulfonate is used as an emulsifying agent, is excellent in the wetting properties of the latex on the surface of a mold and in the chemical stability (salt coagulability) of the latex to a coagulant solution, and its molded products are free of pinholes, shrinkage and surface stickiness, and have high oil resistance, high mechanical strength as well as soft feeling to the skin of the user. On the basis of this finding, they extensively studied and completed the present invention.

That is, the present invention relates to:
(1) A latex for dip molding, which is obtainable by emulsion polymerization of 100 parts by weight of a monomer mixture in the presence of 0.5 to 10.0 parts by weight of alkyl benzene sulfonate containing at least 10 weight % of $C_{13-20}$ alkyl benzene sulfonate.
(2) The latex for dip molding according to item 1, wherein the alkyl benzene sulfonate contains at least 25 weight % of $C_{13-20}$ alkyl benzene sulfonate.
(3) The latex for dip molding according to item 1, wherein the alkyl benzene sulfonate contains at least 40 weight % of $C_{13-20}$ alkyl benzene sulfonate.
(4) The latex for dip molding according to any one of items 1 to 3, wherein the emulsion polymerization is conducted by the use of redox type of polymerization initiator containing no transition metal salt.
(5) The latex for dip molding according to item 4, wherein the redox type polymerization initiator containing no transition metal salt is a combination product of an oil-soluble peroxide with a reducing agent.
(6) The latex for dip molding according to item 5, wherein the reducing agent is an alkali metal sulfonate or ammonium sulfonate.

(7) The latex for dip molding according to item 6, wherein the alkali metal sulfonate is sodium formaldehyde sulfoxylate.

(8) The latex for dip molding according to any one of items 1 to 7, wherein 100 parts by weight of the monomer mixture comprises 15 to 45 parts by weight of a vinyl cyanide monomer, 35 to 80 parts by weight of a conjugated diene monomer, 0.1 to 20 parts by weight of an ethylenically unsaturated carboxylic acid, and 0 to 20 parts by weight of other ethylenically unsaturated monomer copolymelizable with the above monomers.

(9) The latex for dip molding according to any one of items 1 to 8, wherein the emulsion polymerization of the monomer mixture is carried out in the presence of a seed polymer having an average particle diameter of 10 to 90 nm and a glass transition temperature (Tg) of −50 to 50° C. obtained by emulsion polymerization of a vinyl cyanide monomer and an ethylenically unsaturated monomer copolymerizable therewith.

(10) A dip molded product produced by dip molding from the latex for dip molding described in any one of items 1 to 9.

(11) The dip molded product according to item 10, which is a glove or a fingerstalls.

DETAILED DESCRIPTION OF THE INVENTION

The process for producing the latex for dip molding according to the present invention is described.

The latex used in the present invention is obtained by emulsion polymerization of a monomer mixture, and the monomer used is not particularly limited insofar as the resulting polymer has rubber-like properties. Preferably the monomer mixture comprises a vinyl cyanide monomer, a conjugated diene monomer and an ethylenically unsaturated carboxylic acid and, if necessary, an ethylenically unsaturated monomer copolymerizable with these monomers.

The vinyl cyanide monomer includes acrylonitrile, methacrylonitrile, α-cyanoethylacrylonitrile, fumaronitrile etc. These vinyl cyanide monomers can be used singly or in combination thereof. In the present invention, acrylonitrile is particularly preferably used.

The amount of such a vinyl cyanide monomer used is 15 to 45 parts by weight, preferably 23 to 40 parts by weight, in 100 parts by weight of the monomer mixture. If the amount of the vinyl cyanide monomer is less than 15 parts by weight, the oil resistance and chemical resistance of the resulting dip molded product may be inadequate, whereas if it exceeds 45 parts by weight, the copolymerization reaction of the vinyl cyanide monomer and the conjugated diene monomer hardly proceeds so that a homopolymer of the vinyl cyanide monomer may be formed.

The conjugated diene monomer used may be a monomer usually used for production of latex, such as 1,3-butadiene, isoprene, 2-chloro-1,3-butadiene and 2-methyl-1,3-butadiene. These conjugated diene monomers can be used singly or in combination thereof. In the present invention, 1,3-butadiene is preferably used.

The amount of such a conjugated diene monomer used is in the range of 35 to 80 parts by weight, preferably 45 to 70 parts by weight, in 100 parts by weight of the monomer mixture.

If the amount of the conjugated diene monomer is less than 35 parts by weight, the resulting dip molded product may feel stiff. On the other hand, if it is more than 80 parts by weight, the mechanical strength of the dip molded product may be lowered.

The ethylenically unsaturated carboxylic acid monomer includes e.g. monocarboxylic acids such as (meth)acrylic acid and crotonic acid, and dicarboxylic acids such as maleic acid, fumaric acid and itaconic acid, as well as anhydrides thereof, for example dicarboxylic acid monoesters i.e. half esters such as methyl maleate and methyl itaconate. These ethylenically unsaturated carboxylic acid monomers can be used singly or in combination thereof. Further, these ethylenically unsaturated carboxylic acid monomers can also be used as alkali metal salts or ammonium salts. Among these, acrylic acid and methacrylic acid are particularly preferably used.

The amount of such an ethylenically unsaturated carboxylic acid monomer used is in the range of 0.1 to 20 parts by weight, preferably 1 to 15 parts by weight and more preferably 3 to 7 parts by weight in 100 parts by weight of the monomer mixture. If its amount is less than 0.1 part by weight, the mechanical strength of the resulting dip molded product may be lowered. On the other hand, if it is more than 20 parts by weight, the product may feel stiff.

The copolymerizable ethylenically unsaturated monomers other than the monomers described above include e.g. aromatic vinyl compounds such as styrene and α-methylstyrene, unsaturated alkyl carboxylates such as methyl acrylate, ethyl acrylate, butyl acrylate, 2-hydroxyethyl acrylate, methyl methacrylate, 2-hydroxyethyl methacrylate and glycidyl methacrylate, ethylenically unsaturated carboxylic acid amide compounds such as acrylamide, methacrylamide, N,N-dimethylacrylamide and N-methylolacrylamide, vinyl carboxylates such as vinyl acetate, and ethylenically unsaturated amine compounds such as methyl aminoethyl (meth)acrylate, dimethyl aminoethyl (meth)acrylate and 2-vinylpyridine. These can be used singly or in combination thereof.

The amount of these ethylenically unsaturated monomers used is 0 to 20 parts by weight, preferably 0 to 10 parts by weight, in 100 parts by weight of the monomer mixture.

In the present invention, a polyhydroxy compound may be added during production of the latex in order to give soft feeling to the skin on the resulting dip molded product.

The polyhydroxy compound is added preferably before or during polymerization of the monomers. In the case where the polyhydroxy compound is added during polymerization, it is added preferably before the degree of polymerization of the monomer mixture reaches 70%, preferably 50%, because the effect of giving the soft feeling of the product to the skin tends to be decreased as the degree of polymerization increases.

Such a polyhydroxy compound is preferably the polyhydroxy compound with a molecular weight of 1000 or less, and the examples include glycols such as propylene glycol, dipropylene glycol, trimethylene glycol, 1,4-butane diol, 1,5-pentane diol, 1,6-hexane diol and pinacol, trivalent alcohols such as glycerin and trimethylol propane, tetravalent alcohols such as erythritol, pentaerythritol and threitol, and hexavalent alcohols such as sorbitol, as well as sucrose and other polyether polyols. Among these, glycols are preferable, and propylene glycol is more preferable. The amount of the polyhydroxy compound used is preferably in the range of 1 to 10 parts by weight, more preferably 2 to 7 parts by weight, every 100 parts by weight of the monomer mixture.

For production of the latex in the present invention, a conventional method of emulsion polymerization, for example, a method for conducting emulsion polymerization by adding the monomer mixture, a polymerization chain transfer agent, a polymerization initiator and an emulsifying agent to an aqueous medium such as water may be employed.

The polymerization chain transfer agent can make use of a usual chain transfer agent generally known in emulsion polymerization.

Examples of such a chain transfer agent include mercaptocarboxylic acids such as 2-mercaptopropionic acid or salts thereof (e.g., ammonium mercaptoacetate), mercaptodicarboxylic acids such as mercaptosuccinic acid or salts thereof (e.g., mercaptodicarboxylates), mercaptans having a hydroxyl group in the molecule, such as 2-mercaptoethanol, mercaptans having an amino group in the molecule, such as 2-mercaptoethylamine, monosulfides having a carboxyl group in the molecule, such as thioglycolic acid and 3,3'-thiodipropionic acid or salts thereof, monosulfides having a hydroxyl group in the molecule, such as β-thiodiglycol, monosulfides having an amino group in the molecule, such as thiodiethyl amine, disulfides having a carboxyl group in the molecule, such as dithiodiglycolic acid and 2,2'-dithiodipropionic acid or salts thereof, acid anhydrides of monosulfides and disulfides, such as thiodiglycolic acid anhydride, disulfides having a carboxyl group and an amino group in the molecule, such as D-, L or D,L-cystine, halogenated hydrocarbons having a hydroxyl group in the molecule, such as chloromethanol and 2-chloroethanol, halogenated hydrocarbons having a carboxyl group in the molecule, such as monochloroacetic acid, dichloroacetic acid, chlorofumaric acid, chloromaleic acid and chloromalonic acid or salts thereof, acid anhydrides of halogenated hydrocarbons, such as chloromaleic acid anhydride, monothiols such as hexyl mercaptan, octyl mercaptan, n-dodecyl mercaptan and t-dodecyl mercaptan, dithiols such as 1,10-decane diol and triglycol dimercaptan, trithiols such as trimethylol propane tristhioglycolate, polythiols having at least 2 mercapto groups in the molecule, such as tetrathiols for example pentaerythritol tetrakisthioglycolate, xanthogen disulfides such as dimethyl xanthogen disulfide and diethyl xanthogen disulfide, thiuram disulfides such as tetramethyl thiuram disulfide, hydrocarbon halides such as carbon tetrachloride and carbon tetrabromide, alkyl mercaptocarboxylates such as 2-ethylhexyl mercaptoacetate and tridecyl mercaptopropionate, alkoxy alkyl mercaptocarboxylates such as methoxybutyl mercaptoacetate and methoxybutyl mercaptopropionate, mercaptoalkyl carboxylates such as 2-mercaptoethyl octanoate, as well as α-methyl styrene dimer, terpinolene, α-terpinene, γ-terpinene, dipentene, anisole and allyl alcohol.

These chain transfer agents are used singly or in combination thereof. In the present invention, monothiol, polythiol, xanthogen disulfide, thiuram disulfide, 2-ethylhexyl mercaptoacetate, 2-mercaptoethyl octanoate, methoxybutyl mercaptoacetate, methoxybutyl mercaptopropioate, a-methyl styrene dimer and terpinolene are preferably used. Among these compound, monothiol compounds, especially t-dodecyl mercaptan is preferably employed.

The amount of these chain transfer agents used is usually in the range of 0.05 to 20 parts by weight, more preferably 0.1 to 15 parts by weight, most preferably 0.2 to 10 parts by weight relative to 100 parts by weight of the monomer mixture.

As the polymerization initiator, the so-called redox polymerization initiator comprising a combination of an oxidizing agent and a reducing agent in a system of generating radicals by transferring electrons from the coexisting reducing agent is used as the polymerization initiator.

In the present invention, the redox polymerization initiator containing no transition metal salts, especially, redox polymerization initiator comprising oxidizing component and reducing component.

Such an oxidizing component includes e.g. organic peroxides showing a half-life of 10 hours at a temperature of 100° C. or more, such as cumene hydroperoxide, benzoyl peroxide, t-butyl hydroperoxide, acetyl peroxide, diisopropyl benzene hydroperoxide and 1,1,3,3-tetramethyl butyl hydroperoxide, and particularly cumene hydroperoxide is preferably used.

The optimum reducing component in the present invention include e.g. alkali metal such as sodium and potassium or ammonium sulfite, hydrosulfite, pyrosulfite, pyrodithionate, dithionate and thiosulfate, for example reducing sulfonates such as formaldehyde sulfonate and benzaldehyde sulfonate. The alkali metals constituting these salts make use of e.g. sodium and potassium, preferably sodium. Among these reducing agents, sodium formaldehyde sulfoxylate is preferably used.

Further, it is also preferable to employ e.g. carboxylic acids such as L-ascorbic acid, tartaric acid and citric acid, reducing sugars such as dextrose and saccharose, and amines such as dimethyl aniline and triethanolamine.

In the present invention, though a salt of transition metal such as iron, copper, nickel, cobalt, chromium, molybdenum, vanadium or cerium, for example, ferrous sulfate, ferrous ammonium sulfate, cuprous naphthenate may be used, the use of these salts gives rise to coloration and bad smell of the products.

In the present invention, the amount of the oxidizing agent in the polymerization initiator is usually about 0.01 to 1.0 part by weight, preferably about 0.1 to 0.5 part by weight, relative to 100 parts by weight of the entire monomer mixture. If the amount is less than 0.01 part by weight, the polymerization reaction is time-consuming and not practical, while if the amount exceeds 1.0 part by weight, the reaction rate is too high, thus making regulation of the reaction difficult.

The ratio of the oxidizing agent to the reducing agent (oxidizing agent/reducing agent) is in the range of from 0.1 to 10.0, preferably from 0.2

In the present invention, the alkyl benzene sulfonate containing at least 10 weight %, preferably 25 weight %, more preferably 40 weight % of $C_{13-20}$ alkyl benzene sulfonate is employed as the emulsifying agent in the emulsion polymerization. The $C_{13-20}$ alkyl benzene sulfonate includes e.g. tetradecyl benzene sulfonate whose alkyl group contains 14 carbon atoms, pentadecyl benzene sulfonate whose alkyl group contains 15 carbon atoms, hexadecyl benzene sulfonate whose alkyl group contains 16 carbon atoms, and octadecyl benzene sulfonate whose alkyl group contains 18 carbon atoms.

Among these $C_{13-20}$ alkyl benzene sulfonate, those containing at least 40 weight %, preferably more than 50 weight % of $C_{15}$ alkyl benzene sulfonate relative to the total amount of $C_{13-20}$ alkyl benzene sulfonate are satisfactorily used.

The alkyl benzene sulfonate other than $C_{13-20}$ alkyl benzene sulfonate include $C_{6-12}$ alkyl benzene sulfonate such as hexylbenzene sulfonate whose alkyl group contains 6 carbon atoms, nonylbenzene sulfonate whose alkyl group contains 9 carbon atoms, and dodecylbenzene sulfonate whose alkyl group contains 12 carbon atoms.

The alkyl benzene sulfonates include, but are not limited to, salts of alkali metals such as lithium, potassium and sodium or alkaline earth metals such as calcium and barium, and ammonium salts. Among these salts, sodium, potassium, calcium and ammonium salts are preferably used, and sodium salts are more preferably used.

The amount of the alkyl benzene sulfonates used solely or as a mixture is 0.5 to 10 parts by weight, preferably 1.0 to 7.0 parts by weight, more preferably 2.0 to 5.0 parts by weight, relative to 100 parts by weight of the monomer mixture. If its content is less than 0.5 part by weight, the reaction stability in production of latex is not satisfactory so that coagulated materials may be generated, or the product may be inferior in wetting properties on a mold. On the other hand, if its content is higher than 10 parts by weight, bubbles mixed in the latex do not disappear and these bubbles may cause pinholes in the dip molded product.

In the present invention, anionic surfactants such as sodium lauryl sulfate and α-sulfonated fatty acid salts, nonionic surfactants such as amphoteric surfactants of alkyl betaine salts, such as salts of lauryl betaine and stearyl betaine, and amphoteric surfactants of amino acid type, such as lauryl-β-alanine, lauryl di(aminoethyl) glycine and octyl di(aminoethyl) glycine can further be used in combination insofar as their amount is less than 20% of the total amount of the alkyl benzene sulfonates.

The emulsion polymerization in the method of the present invention may be conducted in the presence of a chelating agent such as sodium ethylene diamine tetraacetate, a dispersant such as polycarboxylates and an inorganic salt such as phosphates, if necessary.

For production of the latex in the present invention, the emulsion polymerization is conducted usually at a temperature of 0 to 100° C. until the degree of conversion of the monomer mixture reaches 90%, preferably 95% or more.

When the emulsion polymerization is conducted at 50° C. or less, preferably 0 to 40° C., the latex can be stably produced and a dip molded product having high mechanical strength and soft feeling property to the skin can be obtained.

As the method of emulsion polymerization, a method wherein the monomer component is added all at once to the polymerization system, and a polymerization method wherein the monomer components are added continuously or in divided portions to the polymerization system may be employed.

For production of the latex in the present invention, the emulsion polymerization is conducted preferably in the presence of a seed polymer having an average particle diameter of 10 to 90 nm and Tg of −50 to 50° C. obtained previously by emulsion polymerization of ethylenically unsaturated monomers copolymerizable with the vinyl cyanide monomer.

The vinyl cyanide monomer used in polymerization for the seed includes acrylonitrile, methacrylonitrile, α-cyanoethyl acrylonitrile and fumaronitrile. These vinyl cyanide monomers are used singly or in combination thereof. In the present invention, acrylonitrile can be preferably used. The ethylenically unsaturated monomers copolymerizable with this vinyl cyanide monomer include e.g. aromatic vinyl compounds such as styrene and α-methyl styrene, unsaturated alkyl carboxylates such as methyl acrylate, ethyl acrylate, butyl acrylate, 2-hydroxyethyl acrylate, methyl methacrylate, 2-hydroxyethyl methacrylate and glycidyl methacrylate, ethylenically unsaturated carboxylic acid amides such as acrylamide, methacrylamide, N,N-dimethyl acrylamide and N-methylol acrylamide, vinyl carboxylates such as vinyl acetate, ethylenically unsaturated amines such as methyl aminoethyl (meth)acrylate, dimethyl aminoethyl (meth)acrylate and 2-vinylpyridine, conjugated diene monomers such as 1,3-butadiene, isoprene, 2-chloro-1,3-butadiene and 2-methyl-1,3-butadiene, ethylenically unsaturated carboxylic acid monomers, for example monocarboxylic acids such (meth)acrylic acid and crotonic acid, dicarboxylic acids such as maleic acid, fumaric acid and itaconic acid, as well as anhydrides thereof, for example dicarboxylic acid monoesters i.e. half esters, such as methyl maleate and methyl itaconate. In the present invention, butyl acrylate is particularly preferably used. The mixing ratio of the vinyl cyanide monomer and copolymerizable ethylenically unsaturated monomer is arbitrary as long as the Tg of the resulting copolymer is within −50 to 50° C.

The amount of the monomer mixture used for production of the seed polymer in the present invention is 0.5 to 10 parts by weight, preferably 1 to 5 parts by weight, relative to 100 parts by weight of the monomer mixture used for production of the latex.

In the emulsion polymerization for production of the seed polymer, surfactants such as anionic and nonionic surfactants may be used. The anionic surfactant includes e.g. sodium dodecyl benzene sulfonate, sodium octyl benzene sulfonate, sodium lauryl sulfate, α-sulfonated fatty acid salts etc. The nonionic surfactant includes e.g. polyoxyethylene alkyl esters, polyoxyethylene alkyl aryl ethers etc. Among these, sodium dodecyl benzene sulfonate is preferably used.

The amount of the surfactant used is 1 to 20% by weight, preferably 2 to 10% by weight, relative to the total amount of the monomer mixture used in polymerization for the seed.

The emulsion polymerization in production of the seed polymer may be conducted in the presence of a chelating agent such as sodium ethylene diamine tetraacetate, a dispersant such as polycarboxylates and an inorganic salt such as phosphates.

The polymerization initiator used in production of the seed polymer may be the same as in emulsion polymerization of the monomer mixture as described above, and the amount of the initiator used is 0.1 to 10% by weight, preferably 0.5 to 7% by weight, relative to the total amount of the monomer mixture used in polymerization for the seed.

For production of the seed polymer in the present invention, a chain transfer agent, typically mercaptans, may be used. Production of the seed polymer is conducted usually at a temperature of 20 to 80° C. until the degree of polymerization reaches 90%, preferably 95% or more.

The average particle diameter of the seed polymer is in the range of 10 to 90 nm, preferably 20 to 80 nm. If the average particle diameter of the seed polymer is less than 10 nm, it is difficult to attain a uniform particle diameter for the resulting latex. On the other hand, if it is more than 90 nm, the particle diameter of the resulting latex is too large, and much longer period is required for obtaining the predetermined degree of polymerization of the monomer mixture.

The Tg of the seed polymer is in the range of −50 to 50° C., preferably −40 to 30° C. If it is lower than −50° C., the mechanical strength of the dip molded product may be lowered, while if it exceeds 50° C., the dip molded product may give stiff feeling to the skin.

This polymerization method using the seed is advantageous, for example, the polymerization stability can be improved and, as compared with a usual method of emulsion polymerization conducted in the absence of a seed polymer, the number of particles during polymerization can be regulated by the seed polymer and thus the particle diameter of the resulting latex can be arbitrarily controlled.

Usually, the average particle diameter of the latex used in the present invention is 90 to 200 nm, more preferably 100 to 180 nm. If the average particle diameter is less than 90 nm, the viscosity of the latex is increased so that e.g. transportation of the latex may be hindered. On the other hand, if it exceeds 200 nm, coagulated materials are apt to generate during emulsion polymerization of the latex.

The gel content (methyl ethyl ketone-insolubles) in the copolymer obtained from the latex used in the present invention is 10 to 70% by weight, preferably 20 to 60% by weight. If the gel content is too high, the molded product becomes too stiff and the feeling to the skin is deteriorated. On the other hand, if it is too low, the latex becomes increasingly thickened with an alkali, so that the viscosity of the latex may be increased excessively.

The gel content in the copolymer is determined by weighing a film obtained by drying the latex, immersing the film in methyl ethyl ketone, filtering it, weighing its dried insolubles, and measuring the ratio of the weight of the dried insolubles to the dry weight of the original film.

In order to produce the dip molding products, a latex compound for dip molding is prepared by mixing the latex of the present invention with a proper amount of a vulcanizing agent, a vulcanization accelerator, a vulcanizing auxiliary, a pH adjusting agent and the like.

The vulcanizing agents include sulfur and sulfur compounds such as colloidal sulfur, sublimed sulfur, by-produced sulfur, sulfur chloride; sulfur group elements such as selenium and tellurium, compounds which produce sulfur by thermal degradation such as thiuram polysulfide, morpholine and thioplast.

The vulcanization accelerators include aldehyde-amine type accelerators such as methylchloride-formaldehyde-ammonia reaction products: thiourea type accelerators such as thiocarbanilide and thiourea; guanidine type accelerators such as diphenylguanidine; thiazole type accelerators such as mercaptobenzothiazole and dibenzothia disulfide; thiuram type accelerators such as tetramethylthiuram disulfide and tetramethylthiuram monosulfide; dithiocarbamate type accelerators such as zinc dimethyldithiocarbamate, zinc diethyldithiocarbamate and zinc dibutyldithiocarbamate; xanthate type accelerators such as sodium isopropylxanthogenate.

The vulcanization auxiliaries include metal oxides such as zinc oxide, magnesium oxide and lead oxide; fatty acids such as stearic acid, oleic acid and lauric acid; amine compounds such as diethanolamine and triethanolamine.

The pH adjusting agents include alkaline compound such as ammonia, sodium hydroxide, potassium hydroxide or the like.

The pH of the latex compound for dip molding is usually adjusted to the range of 5 to 12, preferably 7 to 11. If the pH value is less than 5, the resulting latex compounds are inferior in mechanical stability. On the other hand, if the pH value exceeds 12, the mechanical strength of the dip molded product may be lowered.

By incorporating a thickener into the latex for dip molding according to the present invention, the viscosity of the latex for dip molding can be improved. The thickener includes e.g. animal thickeners such as casein, glue and gelatin, plant thickeners such as alginates, starch and gum arabic, mineral thickeners such as bentonite, polymeric thickeners such as polycarboxylates, acrylic copolymers, cross-linked acrylic copolymers, polyvinyl alcohol and polyacrylamide, polyethylene oxide, fiber derivatives such as carboxylated methyl cellulose, methyl cellulose, hydroxypropyl methyl cellulose, hydroxyethyl cellulose, cellulose xanthogenate and carboxylated starch, and cationic thickeners such as cetyl trimethyl ammonium bromide and cetyl pyridinium bromide. In particular, the polymeric thickeners are preferably used, and the carboxylic acid-containing cross-linked acrylic emulsion is more preferably used. The amount of these thickeners used is 0.01 to 1.0 part by weight, preferably 0.02 to 0.1 part by weight, relative to 100 parts by weight of the monomer mixture. If the viscosity of the latex for dip molding according to the present invention is low, there may occur the phenomenon of latex dripping upon raising a mold after immersion in latex, and the addition of the thickener to the latex can solve the problem. However, if the amount of the thickener used is more than 1.0 part by weight, the viscosity of the latex for dip molding becomes high so that once bubbles are formed, they are hardly broken, and pinholes may be caused by the bubbles.

The latex for dip molding according to the present invention may, if necessary, contain rubber latex such as natural rubber latex and isoprene rubber latex, fillers such as phthalic anhydride, benzoic acid, salicylic acid and magnesium carbonate, antioxidants such as styrenated phenol, imidazoles and p-phenylene diamine, odorants such as acetophenone, cinnamic aldehyde, vanillin and lavender oil, fungicides such as thiabendazole, preventol and binyzene, and coloring agents such as fast yellow, phthalocyanine blue and ultramarine.

In order to obtain a dip molded product from the latex for dip molding according to the present invention, it is possible to employ any known dip molding techniques such as direct dip process, anode coagulant dip process and the Teague coagulant dip process.

The method of anode coagulant dip process suitable for production of e.g. surgical gloves and fingerstalls will be described.

First, a mold is dipped in a coagulant solution, and then raised and dried until the surface of the mold is almost dry. This coagulant solution prepared by dissolving calcium salts such as calcium chloride, calcium nitrate and calcium acetate in water, a hydrophilic organic solvent such as alcohol and ketone, or a mixture of thereof. The concentration of the calcium salts in this coagulant is usually 5 to 50% by weight, preferably 10 to 30% by weight. The coagulant solution may, if necessary, contain e.g. surfactants such as nonionic and anionic surfactants, for example fillers such as calcium carbonate, talc and silica gel.

Then, the mold is dipped in the latex for dip molding and then raised whereby the latex is coagulated on the mold, whereupon the latex reacts with the coagulant, to form a rubber-like film on the mold. This film is washed with water, then dried and stripped from the mold to give a dip molded product.

EXAMPLES

The present invention will be described in more detail by reference to the Examples and Comparative Examples, which are however not intended to limit the present invention. In the Examples and Comparative Examples, the terms "part" and "%" are on a weight basis unless otherwise noted.

Example 1

(1) Preparation of Seed Polymers

In the components shown in Table 1 below, the starting materials other than potassium persulfate were introduced into a reaction vessel, and when the temperature was raised to 60° C., potassium persulfate was added thereto. The mixture was allowed to react for 1 hour under stirring and then cooled to 30° C. to give seed polymer emulsions (S1). The starting materials, the Tg (° C.) and the particle diameters of the resulting seed polymers are shown in Table 1.

(2) Production of Latex

Alkyl benzene sulfonic acid B-150 (produced by TAYCA Corp.) was diluted to prepare a 10% solution. To the solution, 10% sodium hydroxide was added to adjust the pH to 7–11, and thus B-151 Na was prepared.

The total amount of the seed polymer (S1) was introduced into a 5-L autoclave where the atmosphere had been replaced by nitrogen, and 65 parts of 1,3-butadiene, 30 parts of acrylonitrile, 5 parts of methacrylic acid, 100 parts of water, 4 parts of B-150 Na and 0.6part of t-dodecyl mercaptan were added thereto. Then, 0.3 part of sodium formaldehyde sulfoxylate and 0.1 part of cumene hydroperoxide were added thereto as the polymerization initiator and the mixture was reacted at 35° C. under stirring.

When the degree of polymerization reached 95% or more after the mixture was reacted for 18 hours, the reaction mixture was adjusted to about pH 8.5 with aqueous ammonia.

Subsequently, steam was introduced into the reaction mixture to remove the unreacted monomer, and the solid content of the latex was concentrated to 45%, to give the desired latex. The compound and physical properties of the latex are shown in Table 2.

(3) Preparation of Latex for Dip Molding

The following materials for the latex were added to the latex obtained above to give a latex compound for dip molding.

Latex Compound for Dip Molding

| | |
|---|---|
| latex (solid content) | 100.0 parts |
| zinc white | 1.5 parts |
| colloidal sulfur | 1.0 part |
| zinc di-n-butyldithiocarbamate | 0.3 part |
| titanium oxide | 3.0 parts |
| potassium hydroxide | 1.0 parts |
| pH | 9.5 |
| solid content | 35% |

(4) Production of a Dip Molded Product

Separately, 15% aqueous calcium nitrate solution was prepared as a coagulant. A mold for the glove preliminarily dried at 80° C. was dipped in this solution for 2 seconds, then raised and dried while rotating it horizontally (80° C.×2 minutes). Subsequently, the mold was dipped for 2 seconds in the compound for dip molding, then raised and dried while rotating it horizontally (80° C.×2 minutes).

Then, the mold coated with a film was washed in warm water at 40° C. for 3 minutes, and heated at 130° C. for 20 minutes to give a film on the surface of the mold. Finally, this film was stripped from the mold to give a glove-shaped dip molded product.

The evaluation results of the dip molded product thus obtained are shown in Table 3.

Examples 2 to 11

The latexes were prepared from the seed polymers shown in Table 1 and the starting materials shown in Table 2 in the same manner as in Example 1.

The emulsifying agents B-120 Na, L-124 Na and B-60 Na were prepared by the same manner to that of Example 1 from alkyl benzene sulfonic acids B-120, L-124 and B-60 (produce by TAYCA Corp., respectively).

The physical properties of the resulting latexes are shown in Table 2. Subsequently, dip molded products were prepared from the latexes obtained in Examples 2 to 11 in the same manner as in Example 1 (3) and (4). The evaluation results are shown in Table 3.

Comparative Example 1

Latexes were prepared from the seed polymers shown in Table 1 and the starting materials shown in Table 2 in the same manner as in Example 1, while B-60 Na was used as the emulsifying agent.

Comparative Example 2

The latex was prepared from the seed polymer shown in Table 1 and the starting materials shown in Table 2 in the same manner as in Example 1.

As the emulsifying agent, disodium dodecyl diphenyl ether disulfonate (Pelex SSL produced by KAO Corp.) were used.

Comparative Example 3

The latex was prepared from the seed polymer shown in Table 1 and the starting materials shown in Table 2 in the same manner as in Example 1.

The content of $C_{13-20}$ alkyl benzene sulfonate in the emulsifying agent was 2.9%.

Comparative Example 4

The latex was prepared from the seed polymer shown in Table 1 and the starting materials shown in Table 2 in the same manner as in Example the starting materials shown in Table 2 in the same manner as in Example 1.

The content of $C_{13-20}$ alkyl benzene sulfonate in the emulsifying agent was 3.3%.

Comparative Example 5

The latex was prepared from the seed polymer shown in Table 1 and the starting materials shown in Table 2 in the same manner as in Example 1.

Sodium lauryl sulfate (Emale 10 produced by KAO Corp.) was used as the emulsifying agent.

Comparative Example 6

The latex was prepared from the seed polymer shown in Table 1 and the starting materials shown in Table 2 in the same manner as in Example 1. Lauryl alcohol ethoxylate (Adecatol LA-975 produced by ASAHI DENKA KOGYO K.K.) was used as the emulsifying agent.

Dip molded products were obtained in the same manner as in Example 1 (3) and (4) from the latexes obtained in Comparative Examples 1 to 6. The evaluation results were shown in Table 3.

Among the various physical properties in Table 3 for the Examples and Comparative Examples, the physical properties of the molded products were evaluated by taking the average of 10 samples measured in the (1) Measurement of Carbon Number of the Alkyl Group in the Alkyl Benzene Sulfonic Acid Alkyl benzene sulfonic acid was added in a large amount of 5% sulfuric acid and heated at 100° C. to give alkyl benzene. After cooling, alkyl benzene was extracted with ethyl ether. The extract was gas-chromatographed, and carbon number of alkyl group was determined from proportions of respective peak-areas.

(2) Average Particle Diameter

Coulter counter MODEL N4+ (Coulter Co., Ltd., JP) was used for measurement.

(3) Methyl Ethyl Ketone-Insoluble Content (Gel Content)

The resulting latex was poured onto a glass plate and dried at room temperature to form a film of 0.3 mm in thickness thereon. This film was cut into squares of 2 to 3 mm, and 0.4 g of the specimen was weighed accurately. The specimen was immersed in 100 ml methyl ethyl ketone and shaken for 6 hours in a shaking thermostatic chamber at 30° C. Thereafter, the specimen was filtered off with a 100-mesh screen. The solid content in the filtrate was determined, and from this solid content in the sol, the gel content was calculated.

(4) Salt Coagulability of the Latex Compound for Dip Molding (Chemical Stability)

A ceramic plate (5 cm×10 cm) was immersed for 10 seconds in 15% calcium nitrate solution, and immediately the ceramic plate was raised and dried under the conditions of 100° C.×3 minutes. Subsequently, the ceramic plate was immersed in a latex having 35 weight % of a solid content for 5 seconds, then raised, kept for 1 second, and immersed in water (1 liter) previously warmed at 40° C.

The degree of water turbidity was judged by measurement* of the concentration of turbid materials by Coulter Counter Model N4+.

⊚: Completely transparent (concentration: 1.0 to 2.0 e+×$10^4$)

α: Very slightly turbid (concentration: 2.1 e+×$10^4$ to 9.9 e+×$10^4$)

Δ: Slightly turbid (concentration: 1.0 e+×$10^5$ to 9.9 e+×$10^6$)

X: Completely turbid (concentration: 1.0 e+×$10^7$ or more)

*Measurement of the Concentration:

The concentration correlates with the degree of light scattering, specifically the number of emitted electrons per second. A larger number is indicative of higher concentration.

(5) Outward Appearance of the Dip Molded Product

The appearance of the dip molded product was visually judged.

+: The dip molded product is white.

±: The dip molded product is freely colored (yellowish).

−: The dip molded product is considerably colored.

(6) Shrinkage in the Dip Molded Product

The shrinkage in the resulting glove-shaped dip molded product was evaluated in terms of shrinkage factor.

o: The shrinkage factor was less than 1%.

X: The shrinkage factor was greater than 1%.

(7) Feeling of the Dip Molded Product to the Skin

A test specimen was punched from the glove-shaped dip molded product by means of a dumbbell modification No. 2, and the feeling of the test specimen was expressed in terms of the strength thereof at 300% elongation after elongation at a stress rate of 300 mm/min. A lower number of 300% modulus is indicative of softer feeling to the skin.

(8) Tensile Strength of the Dip Molded Product and Elongation Thereof at Breakage A test specimen was punched from the glove-shaped dip molded product by means of a dumbbell modification No. 2, and elongated at a stress rate of 300 mm/min. to determine the tensile strength thereof just before breakage.

(9) Pinholes of the Dip Molded Product

The resulting glove-shaped dip molded products were observed for generation of pinholes and evaluated under the following criteria (10 gloves).

⊚: No generation of pinholes.

o: Generation of 1 pinhole in gloves.

Δ: Generation of 2 to 3 pinholes in gloves.

X: Generation of 4 or more pinholes in gloves.

(10) Anti-stickiness of Dip Molded Product

Two gloves produced by the dip molding process were laid one on the other and pressed with a desk pressing machine under the conditions of 50° C.×50 kg×5 minutes and evaluated under the following criteria:

o: Easily pulled the gloves apart.

X: When pulling the two apart, it made a sound with some peeling resistance.

(11) Oil Resistance

After the resulting glove-shaped dip molded product was dipped in petroleum, gasoline and toluene respectively for 24 hours at room temperature, its oil resistance was evaluated in terms of the degree of swollen area determined using the following formula. A lower degree of swollen area is indicative of higher oil resistance.

Degree of swollen area (%)=$A/A_0 \times 100$ $A_0$: The area of the film before immersion, A: The area of the film after immersion.

TABLE 1

| | Starting materials of seed polymer (S) and physical properties of polymer | | | |
|---|---|---|---|---|
| | | (S1) | (S2) | (S3) |
| Component (parts) | Water | 100 | 100 | 100 |
| | Sodium dodecyl benzene sulfonate | 0.1 | 0.075 | 0.05 |
| | Acrylonitrile | 0.3 | 0.3 | 0.2 |
| | Butyl acrylate | 1.7 | 1.0 | 1.5 |
| | Styrene | | 0.7 | 0.3 |
| | Potassium persulfate | 0.1 | 0.1 | 0.1 |
| Physical properties | Tg (° C.) | −33 | −33 | −20 |
| | Average particle diameter (nm) | 60 | 65 | 70 |

TABLE 2

Components and physical properties of the latex

| | | Examples | | | | | | | | | | | Comparative Examples | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 | 4 | 5 | 6 |
| Seed polymer | | S1 | S1 | S1 | S1 | S1 | S2 | S2 | S2 | S1 | S1 | S3 | S1 | S1 | S1 | S2 | S2 | S2 |
| Monomer | Acrylonitrile | 30 | 30 | 30 | 29 | 29 | 34 | 34 | 34 | 30 | 30 | 35 | 30 | 30 | 30 | 34 | 34 | 34 |
| | Butadiene | 65 | 65 | 65 | 65 | 65 | 62 | 62 | 58 | 65 | 65 | 60 | 65 | 65 | 65 | 62 | 62 | 62 |
| | Methacrylic acid | 5 | 5 | 5 | 6 | 6 | 4 | 4 | 4 | 5 | 5 | 5 | 5 | 5 | 5 | 4 | 4 | 4 |
| | Styrene | | | | | | | | 4 | | | | | | | | | |
| Chain transfer agent | t-Dodecyl mercaptan | 0.6 | 0.6 | 0.5 | 0.5 | 0.5 | 0.5 | 0.5 | 0.5 | 0.6 | 0.6 | 0.5 | 0.5 | 0.5 | 0.5 | 0.5 | 0.5 | 0.5 |

TABLE 2-continued

Components and physical properties of the latex

|  |  | Examples |  |  |  |  |  |  |  |  |  |  | Comparative Examples |  |  |  |  |  |
|---|---|---|---|---|---|---|---|---|---|---|---|---|---|---|---|---|---|---|
|  |  | 1 | 2 | 3 | 4 | 5 | 6 | 7 | 8 | 9 | 10 | 11 | 1 | 2 | 3 | 4 | 5 | 6 |
| Emulsi- fying agent | B-150Na | 4 | 2 | 1 | 3 | 0.4 | 0.5 | 0.5 | 0.2 | 2 | 2 | 1 |  |  |  |  |  |  |
|  | B-120Na |  | 2 |  | 1 | 3.6 | 2.5 |  | 3.8 | 2 | 2 | 2.5 |  |  |  | 1 |  |  |
|  | L-124Na |  |  | 3 |  |  |  | 2.5 |  |  |  |  |  |  | 0.5 |  |  |  |
|  | B-60Na |  |  |  |  |  |  |  |  |  |  |  | 4 |  | 3.5 | 3 |  |  |
|  | Emal 10 |  |  |  |  |  |  |  |  |  |  |  |  |  |  |  | 4 |  |
|  | Adecatole LA-975 |  |  |  |  |  |  |  |  |  |  |  |  |  |  |  |  | 4 |
|  | Pelex SSL |  |  |  |  |  |  |  |  |  |  |  |  | 4 |  |  |  |  |
| Number of carbon in alkyl | More than C13 (%) | 99 | 56 | 42 | 77.5 | 25.9 | 27.4 | 35.7 | 17.3 | 56 | 56 | 37.5 | 0 | — | 2.9 | 3.3 | — | — |
|  | Not more than C12 (%) | 1 | 44 | 56 | 22.5 | 74.1 | 72.6 | 64.3 | 82.7 | 44 | 44 | 62.5 | 100 | — | 97.1 | 96.7 | — | — |
| Redox agent | Cumene hydro- peroxide | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
|  | Sodium formaldehyde sulfoxylate | 0.3 | 0.3 | 0.3 | 0.3 | 0.3 | 0.3 | 0.3 | 0.3 | 0.3 | 0.3 | 0.3 | 0.3 | 0.3 | 0.3 |  | 0.3 | 0.3 |
|  | L-Ascorbic acid |  |  |  |  |  |  |  |  |  | 0.3 |  |  |  |  | 0.3 |  |  |
|  | Ferrous sulfate |  |  |  |  |  |  |  |  | 0.1 |  |  |  |  |  |  |  |  |
|  | Cuprous naphthenate |  |  |  |  |  |  |  |  |  |  | 0.1 |  |  |  |  |  |  |
| Charac- teristics of the latex | Solid content (%) | 45 | 45 | 45 | 45 | 45 | 45 | 45 | 45 | 45 | 45 | 45 | 45 | 45 | 45 | 45 | 45 | 45 |
|  | pH | 8.5 | 8.5 | 8.5 | 8.5 | 8.5 | 8.5 | 8.5 | 8.5 | 8.5 | 8.5 | 8.5 | 8.5 | 8.5 | 8.5 | 8.5 | 8.5 | 8.5 |
|  | Average particle diameter (nm) | 130 | 125 | 130 | 130 | 130 | 150 | 170 | 170 | 125 | 130 | 170 | 130 | 130 | 135 | 155 | 165 | 160 |
|  | Gel content (%) | 25 | 25 | 42 | 38 | 40 | 45 | 50 | 54 | 25 | 25 | 55 | 40 | 42 | 45 | 45 | 45 | 45 |

*Emulsifying agent B-150Na, B-120Na, L-124Na, B-60Na: Sodium Alkylbenzene sulfonate
Pelex SSL: Disodium docedyl diphenylether disulfonate
Emale 10: Sodium lauryl sulfate
Adecatole LA-975: Laurylalcohol ethoxylate

TABLE 3

Physical properties of the letex compound for dip molding and dip molded products

|  | Evaluation items | Examples |  |  |  |  |  |  |  |  |  |  | Comparative Examples |  |  |  |  |  |
|---|---|---|---|---|---|---|---|---|---|---|---|---|---|---|---|---|---|---|
|  |  | 1 | 2 | 3 | 4 | 5 | 6 | 7 | 8 | 9 | 10 | 11 | 1 | 2 | 3 | 4 | 5 | 6 |
| Latex compound for dip molding | Salt coagulability | ◎ | ◎ | ◎ | ◎ | ◎ | ◎ | ◎ | ○ | ◎ | ◎ | ◎ | X | X | Δ | Δ | X | X |
| Dip molded product | Outward appearance (coloration) | − | − | − | − | − | − | − | − | ± | ± | − | − | − | − | + | − | − |
|  | Smell | − | − | − | − | − | − | − | − | − | − | ± | − | − | − | + | − | − |
|  | Thickness of gloves (mn) | 0.11 | 0.11 | 0.11 | 0.11 | 0.11 | 0.11 | 0.11 | 0.11 | 0.10 | 0.10 | 0.11 | 0.10 | 0.09 | 0.11 | 0.11 | 0.10 | 0.11 |
|  | Shrink (mn) | ○ | ○ | ○ | ○ | ○ | ○ | ○ | ○ | ○ | ○ | ○ | X | X | ○ | ○ | X | X |
|  | Feeling: 300% modulus (Mpa) | 1.6 | 1.5 | 1.6 | 1.9 | 2.1 | 2.3 | 2.2 | 2.7 | 1.7 | 1.6 | 2.4 | 1.6 | 1.6 | 1.5 | 2.3 | 2.1 | 2.4 |
|  | Elongation strenth at breakage (Mpa) | 19 | 19.2 | 20.4 | 23.5 | 24.9 | 25 | 24.2 | 27.5 | 19.2 | 19.4 | 28.6 | 18 | 17 | 19.8 | 25.1 | 23.6 | 23.9 |
|  | Elongation at brekage (%) | 770 | 760 | 750 | 680 | 670 | 700 | 660 | 610 | 740 | 750 | 600 | 740 | 730 | 750 | 680 | 700 | 680 |
|  | Pinholes | ◎ | ◎ | ◎ | ◎ | ◎ | ◎ | ◎ | ○ | ◎ | ◎ | ◎ | ○ | X | ○ | ○ | Δ | Δ |
|  | Stickness resistance | ○ | ○ | ○ | ○ | ○ | ○ | ○ | ○ | ○ | ○ | ○ | X | X | ○ | ○ | X | X |
|  | Oil resistance, kerosene (%) | 110 | 112 | 112 | 110 | 111 | 106 | 107 | 117 | 112 | 111 | 102 | 110 | 114 | 112 | 106 | 107 | 107 |
|  | Oil resistance, gasoline (%) | 112 | 114 | 118 | 118 | 118 | 114 | 112 | 115 | 114 | 115 | 103 | 112 | 116 | 117 | 115 | 114 | 117 |
|  | Oil resistance, toluene (%) | 120 | 119 | 120 | 122 | 121 | 116 | 117 | 125 | 120 | 119 | 106 | 122 | 121 | 124 | 119 | 118 | 118 |

INDUSTRIAL APPLICABILITY

The latex for dip molding according to the present invention can be used for efficient production of a dip molded product of very high qualities that is excellent in oil resistance, mechanical strength and anti-stickiness and has uniform film thickness, soft feeling to the skin and no pinholes and no shrinkage. Accordingly, the latex for dip molding is useful for production of dip molded products such as medical gloves, and gloves and fingerstalls used in the production site of electronic parts, which require high qualities as mentioned above.

What is claimed is:

1. A latex for dip molding, which is obtained by emulsion polymerization of 100 parts by weight of a monomer mixture in the presence of 0.5 to 10.0 parts by weight of alkyl benzene sulfonate containing at least 10 weight % of $C_{13-20}$ alkyl benzene sulfonate and a redox polymerization initiator containing no transition metal salt, wherein the redox polymerization initiator comprises a combination of an oxidizing agent and a reducing agent, and wherein the reducing agent is an alkali metal sulfonate, ammonium sulfonate, sodium formaldehyde sulfoxylate or L-ascorbic acid.

2. The latex for dip molding according to claim 1, wherein the alkyl benzene sulfonate contains at least 25 weight % of $C_{13-20}$ alkyl benzene sulfonate.

3. The latex for dip molding according to claim 1, wherein the alkyl benzene sulfonate contains at least 40 weight % of $C_{13-20}$ alkyl benzene sulfonate.

4. The latex for dip molding according to claim 1, wherein the redox polymerization initiator containing no transition metal salt is a combination product of an oil-soluble peroxide with a reducing agent.

5. The latex for dip molding according to claim 1, wherein 100 parts by weight of the monomer mixture comprises 15 to 45 parts by weight of a vinyl cyanide monomer, 35 to 80 parts by weight of a conjugated diene monomer, 0.1 to 20 parts by weight of an ethylenically unsaturated carboxylic acid, and 0 to 20 parts by weight of other ethylenically unsaturated monomer copolymerizable with the above monomers.

6. The latex for dip molding according to claim 1, wherein the emulsion polymerization of the monomer mixture is carried out in the presence of a seed polymer having an average particle diameter of 10 to 90 nm and a glass transition temperature (Tg) of −50 to 50° C. obtained by emulsion polymerization of a vinyl cyanide monomer and an ethylenically unsaturated monomer copolymerizable therewith.

* * * * *